United States Patent [19]

Müller et al.

[11] Patent Number: 4,709,152
[45] Date of Patent: Nov. 24, 1987

[54] INFRARED INTRUSION DETECTOR

[75] Inventors: Kurt Müller; Peter Gruber; Alfred Wüthrich, all of Stäfa, Switzerland

[73] Assignee: Cerberus AG, Männedorf, Switzerland

[21] Appl. No.: 818,491

[22] Filed: Jan. 13, 1986

[30] Foreign Application Priority Data

Jan. 24, 1985 [CH] Switzerland .................... 306/85

[51] Int. Cl.[4] .............................................. G01J 5/08
[52] U.S. Cl. .................................... 250/342; 250/353
[58] Field of Search ................... 250/353, 342, 338 R; 340/567, 600

[56] References Cited

U.S. PATENT DOCUMENTS

| 3,703,718 | 11/1972 | Berman | 340/567 |
| 4,263,585 | 4/1981 | Schaefer | 340/567 |
| 4,271,360 | 6/1981 | Ward | 250/353 |
| 4,339,748 | 7/1982 | Guscott et al. | 340/555 |
| 4,551,711 | 11/1985 | Akiyama et al. | 340/567 |

FOREIGN PATENT DOCUMENTS 0065159 11/1982 European Pat. Off. .
0025188 1/1983 European Pat. Off. .

Primary Examiner—Janice A. Howell
Assistant Examiner—Constantine Hannaher

[57] ABSTRACT

An infrared intrusion detector having a predetermined number of rows of radiation reception zones comprises a primary reflector and a secondary reflector for each row of radiation reception zones. The primary reflectors and their associated secondary reflectors form a folded radiation path. The folded radiation path allows for compact construction and simple manufacturing of the infrared intrusion detector. One reflector of each radiation reception zone forms together with the infrared sensor a compact structural unit. The other reflectors of each radiation reception zone are combined to form a further structural unit which is arranged in a predetermined spaced relationship to the first compact structural unit. In order to achieve uniform detection sensitivity in radiation reception zones having different angles of inclination to the horizontal plane, a larger focal length is chosen for radiation reception zones with smaller angles of inclination and longer range. Likewise, to achieve uniform detection sensitivity even with oblique infrared radiation impingement, the surface area of the primary reflectors increases within each horizontal row from the middle to the sides.

17 Claims, 2 Drawing Figures

INFRARED INTRUSION DETECTOR

CROSS REFERENCE TO RELATED APPLICATION

This application is related to the commonly assigned, co-pending U.S. patent application Ser. No. 06/813,508, filed Dec. 26, 1985, and entitled "INFRARED INTRUSION DETECTOR".

BACKGROUND OF THE INVENTION

The present invention broadly relates to an infrared intrusion detector and more specifically pertains to a new and improved construction of an infrared intrusion detector having an infrared sensor and a plurality of reflectors to focus the infrared radiation from a plurality of radiation receiving zones onto the infrared sensor.

In its more particular aspects, the infrared intrusion detector of the present invention focuses the infrared radiation from a plurality of radiation reception zones through a folded radiation path onto the infrared sensor using discrete primary reflectors and a common secondary reflector. The primary reflectors are aligned in a horizontal row and correspond in number to the number of respective radiation reception zones.

In other words, the infrared intrusion detector of the present invention has a predetermined number of radiation reception zones and comprises an infrared sensor and a plurality of reflectors for focusing infrared radiation arriving from the predetermined number of radiation reception zones onto the infrared sensor. The plurality of reflectors comprises a predetermined number of primary reflectors and the predetermined number of primary reflectors forms at least one substantially horizontal row. The plurality of reflectors also comprises at least one common secondary reflector. The predetermined number of primary reflectors and the at least one common secondary reflector cooperate to form a folded radiation path for focusing the infrared radiation arriving from the predetermined number of radiation reception zones onto the infrared sensor. The predetermined number of primary reflectors corresponds in number to the predetermined number of radiation reception zones.

An infrared intrusion detector of this type is known, for example, from FIG. 5 of the European Pat. No. 0,025,188. By folding the path of radiation, it is possible to reduce the construction depth of the infrared intrusion detector by about one-half in the direction of radiation compared with designs not using a folded radiation path. A relatively flat design of the infrared intrusion detector is thereby achieved. The disadvantage of the disclosed arrangement of a plurality of primary reflectors in a horizontal row is that it is only possible to set up a group of horizontally adjacent radiation reception zones. Using this arrangement it is only possible to incompletely cover an area which is to be monitored with radiation reception zones. It is therefore still possible for an intruder to move about in a monitored area without penetrating into a radiation reception zone and thus to remain unobserved. The protection provided by using such an infrared intrusion detector is therefore incomplete and needs improvement.

An infrared intrusion detector has been disclosed in the U.S. Pat. No. 3,703,718, in which a plurality of horizontal rows of reflectors are provided and which are especially shown in FIGS. 9 to 11. This plurality of horizontal rows of reflectors forms a plurality of groups of radiation reception zones with different angles of inclination from the horizontal. However, because no folded path of radiation is intended or provided, the infrared sensors must be separated from the reflectors by a distance equal to the focal length of the reflectors. In an infrared intrusion detector of medium range, the greatest focal lengths encountered are, as a rule, between six and ten centimeters. The depth of the unit and the dimensions of the infrared intrusion detector can therefore be considerable and render inconspicuous mounting impossible. Furthermore, it is a disadvantage that the focal lengths of the different rows of reflectors are selected nearly equal in order to be able to arrange all reflectors in the same approximate location and on the same support bracket. Since the radiation reception zones at different angles of inclination to the horizontal detect an intruder at different distances from the infrared intrusion detector, the fact that the reflectors of the different horizontal rows have the same focal length results in an intruder, into the corresponding radiation reception zones, being imaged by the reflectors in different sizes onto the infrared sensor. There is no provision for matching the infrared sensor area and the body area of an intruder at different distances from the infrared intrusion detector. Thus, the sensitivity of the infrared intrusion detector is different in radiation reception zones having different angles of inclination.

This disadvantage can be avoided according to U.S. Pat. No. 4,339,748, granted July 13, 1982, by choosing different focal lengths of the reflectors of different horizontal rows. In order to achieve a clear image of an intruder at the common infrared sensor, reflector rows having different angles of inclination for different radiation reception zones must be spaced at correspondingly different distances from the common infrared sensor. This requires a complicated optical design because the individual rows of reflectors have to be located at different locations.

The aforesaid infrared intrusion detectors referred to also have a further disadvantage in that the surface areas of the reflectors of a horizontal row are nearly equal or are not significantly different, or even that the surface areas of the lateral reflectors are considerably smaller than the surface areas of the middle reflectors, as shown in FIG. 9 of the aforementioned U.S. Pat. No. 3,703,718. A lesser amount of infrared radiation is conveyed to the surface of the infrared sensor from the therewith associated radiation reception zones which are inclined or tilted relative to the vertical plane of symmetry of the infrared intrusion detector than from the middle or intermediate radiation reception zones. This is due, on the one hand, to the smaller area of the reflector, and, on the other hand, to the smaller apparent area of the infrared sensor element in relation to radiation impinging obliquely upon the infrared sensor element. The sensitivity of prior art intrusion detectors is therefore significantly less in the lateral radiation receiving zones than in the intermediate or middle radiation receiving zones.

SUMMARY OF THE INVENTION

Therefore, with the foregoing in mind, it is a primary object of the present invention to provide a new and improved construction of infrared intrusion detector which does not exhibit the aforementioned drawbacks and shortcomings of the prior art constructions.

Another and more specific object of the present invention aims at providing a new and improved construction of an infrared intrusion detector of the previously mentioned type which exhibits a particularly flat design and which is constructed in a simple and compact fashion.

Yet another object of the present invention is to provide an infrared intrusion detector which exhibits a substantially constant sensitivity at different angles of inclination to the horizontal plane as well as at different angles of inclination to the vertical plane of symmetry in the radiation reception zones of the infrared intrusion detector and thus also a uniform detection sensitivity to an intruder throughout the entire area to be monitored.

Yet a further significant object of the present invention aims at providing a new and improved construction of an infrared intrusion detector of the character described which is relatively simple in construction and design, extremely readily subject to breakdown or malfunction and requires a minimum of maintenance and servicing.

Now in order to implement these a still further objects of the invention, which will become more readily apparent as the description proceeds, the infrared intrusion detector of the present invention is manifested by the features that a plurality of substantially horizontal rows of primary reflectors and a plurality of associated secondary reflectors are provided; these form a plurality of groups of radiation reception zones with each zone having a different angle of inclination to the horizontal plane, whereby at least one of the two reflectors associated with each radiation reception zone is positioned in approximately a vertical plane and the other reflector is positioned at a predetermined spaced relationship therefrom.

In other words, the infrared intrusion detector of the present invention is manifested by the features that the at least one substantially horizontal row of primary reflectors comprises a plurality of rows and the at least one common secondary reflector comprises at least one common secondary reflector associated with each row of the plurality of rows of primary reflectors. Each row of the plurality of rows of primary reflectors defines conjointly with the therewith associated at least one common secondary reflector, a radiation reception zone of the predetermined number of radiation zones. Each radiation reception zone has a different angle of inclination relative to a horizontal plane. One reflector of the primary reflectors and the common secondary reflector associated with each radiation reception zone is arranged at least approximately in a vertical plane. One other reflector of the primary reflectors and the common secondary reflector associated with each radiation reception zone is arranged in a predetermined spaced relationship to said one reflector.

Both the primary as well as the secondary reflectors can exhibit curved surfaces. It is advantageous, however, for one of the two mutually paired reflectors to have a flat surface in order to achieve a simple design of the infrared intrusion detector. It is further advantageous to group together in a single continuous surface, in other words a surface whose gradient of curvature is essentially smooth the secondary reflectors of each radiation reception zone, each radiation reception zone having a different angle of inclination to the horizontal plane so that only the primary reflectors are segmented into individual surfaces.

It is advantageous to arrange and construct the reflectors such that the infrared sensor also lies in the vertical plane of the first reflector and such that the other reflectors also at least approximately lie in a further common vertical plane. Thus, the first reflectors, together with the infrared sensor, can be constructed as a compact structural unit and, likewise, the other reflectors can be constructed as a further structural unit so that a particularly simple and flat design of the infrared intrusion detector is achieved.

It is also especially advantageous if the reflectors are so constructed that their surface areas increase with increasing distance from the middle or from the vertical plane of symmetry of the infrared intrusion detector. This can, for example, be achieved in that the height or width of the primary reflectors within a horizontal row of reflectors successively increases from the middle to the outside. In lieu of this, the common secondary reflectors can also exhibit a continuously increasing height from the middle to the sides. The different possibilities must practically be mutually adapted or mutually adjusted in such a way that the sensitivity is nearly constant in the correspondingly horizontally adjacent radiation reception zones and is independent of the angle of incidence or of the angle of inclination with respect to the vertical plane of symmetry of the infrared intrusion detector.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
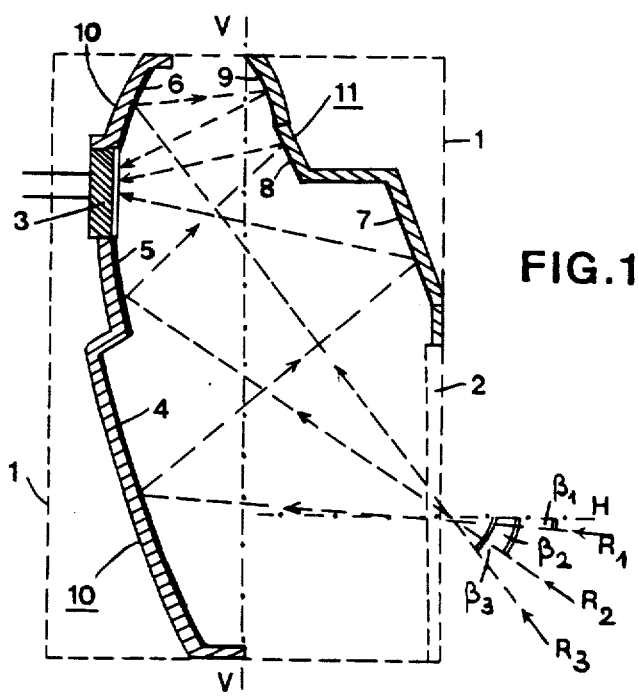
FIG. 1 shows a section of an infrared intrusion detector taken along the vertical plane of symmetry S—S.
Figure 2:
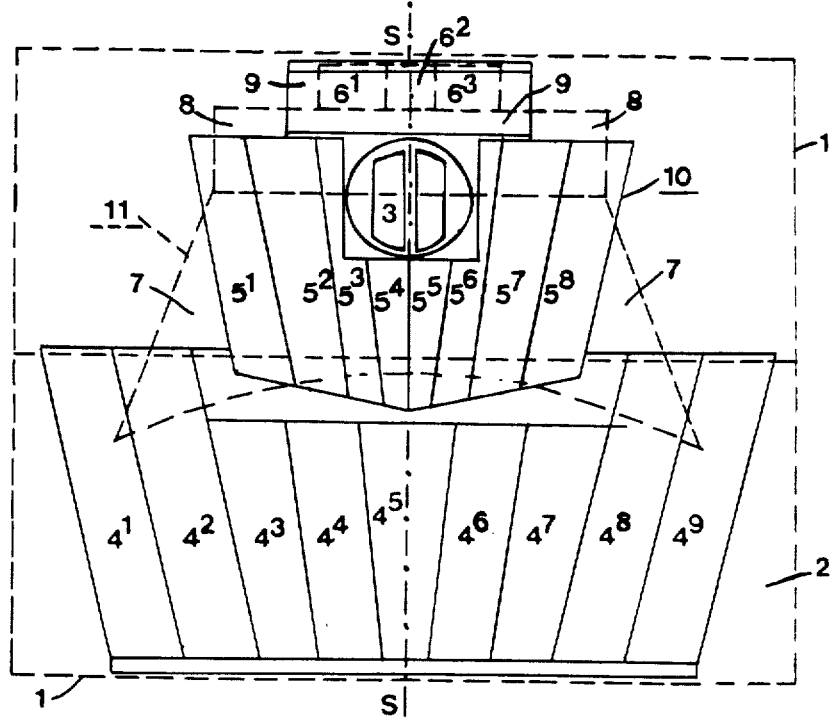
FIG. 2 shows a vertical section of the infrared intrusion detector taken along the plane V—V of FIG. 1.

Describing now the drawings, it is to be understood that to simplify the showing thereof, only enough of the structure of the infrared intrusion detector has been illustrated therein as is needed to enable one skilled in the art to readily understand the underlying principles and concepts of the present invention. Turning now specifically to FIGS. 1 and 2 of the drawings, the apparatus illustrated therein by way of example and not limitation will be seen to comprise components of an infrared intrusion detector shown in different vertical sections. This infrared intrusion detector comprises a schematically illustrated housing 1 having a radiation entrance window 2 and containing a plurality of provided in known manner with a single or a dual infrared sensor element. The reflectors form three separate rows 4, 5 and 6, each row comprising horizontally juxtaposed primary reflectors $4^1$ to $4^9$, $5^1$ to $5^8$ and $6^1$ to $6^3$. Each of the rows 4 to 6 of the primary reflectors $4^1$ to $4^9$, $5^1$ to $5^8$ and $6^1$ to $6^3$ is associated with a respective common secondary reflector 7, 8 and 9. The individual reflectors are so arranged that the primary reflectors $4^1$ to $4^9$ form, conjointly with the secondary reflector 7, a radiation reception zone group $R_1$, the primary reflectors $5^1$ to $5^8$ form, conjointly with the secondary reflector 8, a radiation reception zone group $R_2$ and the primary reflectors $6^1$ to $6^3$ form, conjointly with the secondary reflector 9, a radiation reception zone group $R_3$. The three thus formed radiation reception zone groups $R_1$, $R_2$ and $R_3$ each exhibit a different angle of inclination $\beta_1$, $\beta_2$ and $\beta_3$ to the horizontal plane H. These different angles of inclination $\beta_1$, $\beta_2$ and $\beta_3$ of the radiation reception zone groups $R_1$, $R_2$ and $R_3$ correspond to different detection distances for an intruder in a protected or monitored area, if the infrared intrusion detector is, for example, fastened to a wall of the monitored area at a particular predetermined height. In a typical arrangement, the angles of inclination $\beta_1$, $\beta_2$ and $\beta_3$ could be, for example, $\beta_1=6°$, $\beta_2=16°$ and $\beta_3=40°$.

In order to produce an approximately uniform-sized image of an intruder at different angles of inclination and at different distances in one of the radiation reception zones, the curvatures of the primary reflectors $4^1$ to $4^9$, $5^1$ to $5^8$ and $6^1$ to $6^3$ and of the secondary reflectors 7, 8 and 9 are so mutually adapted or mutually adjusted that the resulting focal lengths become shorter with increasing angle of inclination of the radiation reception zones $R_1$, $R_2$ and $R_3$. Thus, independent of distance, approximately the same sensitivity is available for detection. In the exemplified embodiment with the previously mentioned angles of inclination $\beta_1$, $\beta_2$ and $\beta_3$, it proves advantageous, for example, to step the respective focal lengths at $f_1=70$ mm, $f_2=35$ mm and $f_3=16$ mm.

In order to obtain a simple and compact construction of the infrared intrusion detector, the individual reflectors are combined into two modules or structural components 10 and 11, each of which can be manufactured in one piece. One of the two corresponding reflectors of a radiation reception zone group is contained in the one module or structural component 10 and the other reflector is contained in the other module or structural component 11, which is separated from the first structural component 10. For example, in the illustrated embodiment, the primary reflectors $4^1$ to $4^9$ and $5^1$ to $5^8$ of the radiation reception zone groups $R_1$ and $R_2$ are shown as curved surfaces with flat angles of inclination and a long range. These primary reflectors $4^1$ to $4^9$ and $5^1$ to $5^8$ are combined into the structural component 10 situated below the infrared sensor 3, whereas the corresponding flat or planar secondary reflectors 7 and 8 lie in the other structural component 11. For the near or short-range reception zone group $R_3$ with a large angle of inclination to the horizontal, the primary reflectors $6^1$ to $6^3$ are flat or planar surfaces lying above the infrared sensor 3 in the structural component 10, while the secondary reflector 9 is a curved surface and lies in the other structural component 11. The curvature of the individual curved reflectors can be selected in this arrangement without any special difficulties such that the individual reflector groups $4^1$ to $4^9$, $5^1$ to $5^8$ and $6^1$ to $6^3$ in both structural components 10 and 11 lie at least approximately super-adjacent and such that the modules or structural components 10 and 11 can be easily manufactured in one piece. It is also advantageous to integrate the infrared sensor 3 in one of the structural components 10.

It is possible, in the explained manner, to construct an infrared intrusion detector which is not only especially compact, simple to produce and simple to mount, but which also provides a uniform sensitivity in all radiation reception zones independent of the angle of inclination and the range. Such an infrared intrusion detector is thus capable of detecting an intruder equally well, independent of the distance from the infrared intrusion detector, in the entire area to be monitored.

In an especially advantageous further embodiment, the sensitivity diminution occurring to the sides of hitherto known infrared intrusion detectors, that is in the radiation reception zones having a large angle of inclination to the vertical plane of symmetry S of the infrared intrusion detector, can also be avoided. This can be achieved, as can be especially well seen in the illustrative example shown in FIG. 2, in that the surface areas of the primary reflectors $4^1$ to $4^9$, $5^1$ to $5^8$ and $6^1$ to $6^3$ increase outwards from the middle, i.e., from the plane of symmetry S, to the sides. This can be accomplished in that either the height or the width of the reflectors increases towards the sides or in that both of these dimensions increase at the same time. In this way, for example, the effective area of the primary reflectors $4^1$ to $4^9$, $5^1$ to $5^8$ and $6^1$ to $6^3$ succesively increases outwardly from the middle, i.e., from $4^5$, $5^4$ and $5^5$ as well as $6^2$ to the sides, i.e., $4^1$ and $4^9$, $5^1$ and $5^8$, and $6^1$ and $6^3$.

Conversely, however, the common secondary reflectors 7, 8 and 9 can also be so formed that their heights are smallest in the middle and increase towards the sides, as can be especially well seen for the common secondary reflector 7. By suitably dimensioning the individual reflectors, taking into consideration the oblique incidence of infrared radiation on the reflectors and on the radiation reception surface of the infrared sensor 3, it is possible to obtain approximately the same quantity of infrared radiation detected at the infrared sensor 3 from the lateral radiation reception zones as from the middle radiation reception zone. Thus, the detection sensitivity of the infrared intrusion detector becomes, to a large extent, independent of the angle of inclination of the radiation impingement or incidence to the plane of symmetry S—S of the infrared intrusion detector.

While there are shown and described present preferred embodiments of the invention, it is to be distinctly understood that the invention is not limited thereto, but may be otherwise variously embodied and practiced within the scope of the following claims.

Accordingly, what we claim is:

1. An infrared intrusion detector having a predetermined number of radiation reception zones, comprising:
   an infrared radiation sensor;
   a plurality of reflectors for focusing infrared radiation arriving from said predetermined number of radiation reception zones onto said infrared radiation sensor;
   said plurality of reflectors comprising a predetermined number of primary reflectors;
   said predetermined number of primary reflectors corresponding in number to said predetermined number of radiation reception zones;
   said predetermined number of primary reflectors forming a plurality of substantially horizontal rows;
   said plurality of reflectors comprising at least one common secondary reflector associated with each row of said plurality of rows of primary reflectors;
   said predetermined number of primary reflectors and said at least one common secondary reflector cooperating for focusing said infrared radiation arriving from said predetermined number of radiation reception zones through at least one folded radiation path onto said infrared radiation sensor;

each row of said plurality of rows of primary reflectors conjointly with said therewith associated at least one common secondary reflector defining a respective radiation reception zone group of said predetermined number of radiation reception zones;

each said radiation reception zone group having a different angle of inclination relative to a substantially horizontal plane;

at least one reflector of said primary reflectors and said at least one common secondary reflector associated with each said radiation reception zone being arranged at least approximately in a first substantially vertical plane;

at least one other reflector of said primary reflectors and said at least one common secondary reflector associated with each said radiation reception zone being arranged in a predetermined spaced relationship to said at least one reflector;

said at least one common secondary reflector comprising a plurality of secondary reflectors;

each row of said primary reflectors and an associated one of said plurality of secondary reflectors of a respective radiation reception zone group having a predetermined focal length; and the predetermined focal length of each respective radiation reception zone group of said predetermined number of radiation reception zones decreasing as said angle of inclination relative to said substantially horizontal plane increases.

2. The infrared intrusion detector as defined in claim 1 wherein:
all of said plurality of primary reflectors associated with each predetermined number of radiation reception zones are combined in a first structural unit.

3. The infrared intrusion detector as defined in claim 2, wherein:
said infrared radiation sensor is integrated in said first structural unit of reflectors.

4. The infrared intrusion detector as defined in claim 1, wherein:
each secondary reflector associated with each of said predetermined number of radiation reception zones are combined in a second structural unit.

5. The infrared intrusion detector as defined in claim 4, wherein:
all of said secondary reflectors associated with each of said predetermined number of radiation reception zones are arranged at least approximately in a second substantially vertical plane.

6. The infrared intrusion detector as defined in claim 1, wherein:
at least one reflector of said plurality of primary reflectors and said secondary reflectors associated with each of said predetermined number of radiation reception zones is configured as a single continuous surface having an essentially smooth gradient of curvature thereof; and at least one other reflector of said plurality of primary reflectors and said secondary reflectors comprising a row of reflector segments.

7. The infrared intrusion detector as defined in claim 1, wherein:
said primary reflectors of each row and said at least one common secondary reflector associated therewith are arranged in pairs; and one reflector of each pair of reflectors being configured as a substantially flat mirror.

8. The infrared intrusion detector as defined in claim 1, wherein:
said predetermined number of radiation reception zones includes a short-range radiation reception zone group of a relatively great angle of inclination relative to said substantially horizontal plane;

said primary reflectors of said short-range radiation reception zone group being configured as substantially flat surfaces; and said therewith associated secondary reflector being configured as a single continuously curved surface having an essentially smooth gradient of curvature thereof.

9. The infrared intrusion detector as defined in claim 8, wherein:
said predetermined number of radiation reception zones includes other radiation reception zone groups than said short-range radiation reception zone group;

said primary reflectors of said other radiation reception zone groups having relatively low angles of inclination to said substantially horizontal plane;

said primary reflectors of said other radiation reception zone groups being arranged below said infrared radiation sensor;

said therewith associated secondary reflectors being arranged in predetermined spaced relationship to said primary reflectors of said other radiation reception zone groups;

said primary reflectors of said short-range radiation reception zone having a relatively great angle of inclination to said substantially horizontal plane being arranged above said infrared sensor; and said therewith associated secondary reflector being arranged in predetermined spaced relationship to said primary reflectors of said radiation reception zone having a relatively great angle of inclination.

10. The infrared intrusion detector as defined in claim 1, wherein:
said infrared intrusion detector has sides;
a reflecting surface area of at least a portion of said primary reflectors increasing from the middle of the infrared intrusion detector towards said sides.

11. The infrared intrusion detector as defined in claim 1, wherein:
said infrared intrusion detector has sides;
a reflecting surface height of at least a portion of said primary reflectors increasing from the middle of the infrared intrusion detector towards said sides.

12. The infrared intrusion detector as defined in claim 11, wherein:
the height of at least a portion of said secondary reflectors increases from the middle of the infrared intrusion detector towards said sides.

13. The infrared intrusion detector as defined in claim 11, wherein:
the height of at least a portion of said secondary reflectors increases from a plane of symmetry of the infrared intrusion detector towards said sides.

14. The infrared intrusion detector as defined in claim 1, wherein:
said infrared intrusion detector has sides;
a reflecting surface width of at least a portion of said primary reflectors increasing from the middle of the infrared intrusion detector towards said sides.

15. The infrared intrusion detector as defined in claim 1, wherein:
   said infrared intrusion detector has sides;
   a reflecting surface height and width of at least a portion of said primary reflectors increasing from the middle of the infrared intrusion detector towards said sides.

16. An infrared intrusion detector having a predetermined number of radiation reception zones, comprising:
   an infrared radiation sensor;
   a plurality of reflectors for focusing infrared radiation arriving from said predtermined number of radiation reception zones onto said infrared radiation sensor;
   said plurality of reflectors comprising a predetermined number of primary reflectors;
   said predetermined number of primary reflectors corresponding in number to said predetermined number of radiation reception zones;
   said predetermined number of primary reflectors forming a plurality of substantially horizontal rows;
   said plurality of reflectors comprising at least one common secondary reflector associated with each row of said plurality of rows of primary reflectors;
   said predetermined number of primary reflectors and said at least one common secondary reflector cooperating for focusing said infrared radiation arrriving from said predetermined number of radiation reception zones through at least one folded radiation path onto said infrared radiation sensor;
   said predetermined number of primary reflectors comprising at least one curved reflector and at least one flat reflector arranged in respective ones of said plurality of substantially horizontal rows;
   each row of said plurality of rows of primary reflectors conjointly with said therewith associated at least one common secondary reflector defining a respective radiation reception zone group of said predetermined number of radiation reception zones;
   each said radiation reception zone group having a different angle of inclination relative to a substantially horizontal plane;
   at least one reflector of said primary reflectors and said at least one common secondary reflector associated with each said radiation reception zone being arranged at least approximately in a first substantially vertically plane; and
   at least one other reflector of said primary reflectors and said common secondary reflector associated with each said radiation reception zone being arranged in a predetermined spaced relationship to said at least one reflector.

17. The infrared intrusion detector as defined in claim 16, wherein:
   said predetermined number of radiation reception zones includes a short-range radiation reception zone group of a relatively great angle of inclination relative to said substantially horizontal plane; and
   said at least one curved reflector of said primary reflectors being associated with said short-range radiation reception zone group.

* * * * *

UNITED STATES PATENT AND TRADEMARK OFFICE
CERTIFICATE OF CORRECTION

PATENT NO. : 4,709,152

DATED : November 24, 1987

INVENTOR(S) : KURT MüLLER et al

It is certified that error appears in the above-identified patent and that said Letters Patent is hereby corrected as shown below:

Column 3, line 17, after "extremely" please insert --economical to manufacture, highly reliable in operation, not--

Column 3, line 20, please replace "a" by --and--

Column 4, line 55, after "plurality of" please add -- reflectors as well as an infrared sensor 3 which can be--

Claim 2, line 4, after "each" please add --of said--

Column 10, line 18, please replace "vertically" by --vertical--

Signed and Sealed this

Fourteenth Day of June, 1988

*Attest:*

DONALD J. QUIGG

*Attesting Officer*  *Commissioner of Patents and Trademarks*